(12) United States Patent
Yang

(10) Patent No.: US 8,272,988 B2
(45) Date of Patent: *Sep. 25, 2012

(54) RETROGRADE TORQUE LIMIT BICYCLE WITH BIDIRECTIONAL INPUT AND ONE-WAY OUTPUT

(76) Inventor: Tai-Her Yang, Dzan-Hwa (TW)

( * ) Notice: Subject to any disclaimer, the term of this patent is extended or adjusted under 35 U.S.C. 154(b) by 216 days.

This patent is subject to a terminal disclaimer.

(21) Appl. No.: 12/656,666

(22) Filed: Feb. 12, 2010

(65) Prior Publication Data

US 2011/0201468 A1 Aug. 18, 2011

(51) Int. Cl.
*F16H 48/00* (2012.01)
(52) U.S. Cl. ........................................ 475/12
(58) Field of Classification Search .............. 475/12, 475/263
See application file for complete search history.

(56) References Cited

U.S. PATENT DOCUMENTS

| | | | | |
|---|---|---|---|---|
| 4,150,590 A * | 4/1979 | Hurst | | 475/309 |
| 4,468,985 A * | 9/1984 | Nilsson | | 475/183 |
| 5,435,583 A * | 7/1995 | Foster, Jr. | | 280/237 |
| 5,531,651 A * | 7/1996 | Yang | | 475/12 |
| 5,607,369 A * | 3/1997 | Yang | | 475/12 |
| 5,765,847 A * | 6/1998 | Toronto et al. | | 280/237 |
| 5,884,927 A * | 3/1999 | Mahaney et al. | | 280/237 |
| 5,895,336 A * | 4/1999 | Yoo | | 475/318 |
| 5,904,362 A * | 5/1999 | Yoo | | 280/237 |
| 6,695,332 B1 * | 2/2004 | Kang | | 280/237 |
| 7,497,793 B2 * | 3/2009 | Hee | | 474/80 |
| 7,644,944 B2 * | 1/2010 | Nicolai | | 280/257 |
| 7,815,542 B2 * | 10/2010 | Dec | | 475/326 |
| 2003/0034627 A1 * | 2/2003 | Kim et al. | | 280/237 |
| 2006/0119068 A1 * | 6/2006 | Hee | | 280/260 |
| 2011/0177902 A1 * | 7/2011 | Yang | | 475/12 |
| 2011/0190085 A1 * | 8/2011 | Yang | | 475/12 |
| 2011/0190086 A1 * | 8/2011 | Yang | | 475/12 |
| 2011/0190087 A1 * | 8/2011 | Yang | | 475/12 |
| 2011/0201469 A1 * | 8/2011 | Yang | | 475/12 |

* cited by examiner

*Primary Examiner* — Dirk Wright
(74) *Attorney, Agent, or Firm* — Bacon & Thomas, PLLC

(57) ABSTRACT

The present invention is applied to pedal vehicles, or mixture of electric and pedal vehicles, or combination of electric and pedal auxiliary vehicles, especially to a bicycle capable of being pedaled bidirectionally and driven to move in unidirectional, and through the torque limit transmission being transferred into overload sliding or disengaging status, the retrograde torque limit bicycle with bidirectional input and one-way output is prevented from being locked.

16 Claims, 5 Drawing Sheets

RETROGRADE TORQUE LIMIT BICYCLE WITH BIDIRECTIONAL INPUT AND ONE-WAY OUTPUT

BACKGROUND OF THE INVENTION (a) Field of the Invention

The retrograde torque limit bicycle with bidirectional input and one-way output of the present invention drives the input terminal of the human input device at forward or reverse dual rotary directions through human's foot, and then the output terminal of the human input device transmits the kinetic energy to the input terminal of the retrograde torque limit transmission with bidirectional input and one-way output, and the output terminal of the retrograde torque limit transmission with bidirectional input and one-way output produces constant rotary direction output to drive the load wheel set; and when the load wheel set moves back, the reverse drive of contrary rotary direction caused by back move occurs at output terminal, and when the torque exceeds the set overload torque of the torque limit transmission, through the torque limit transmission being transferred into overload sliding or disengaging status, the retrograde torque limit bicycle with bidirectional input and one-way output of the present invention is prevented from being locked.

The present invention is applied to pedal vehicles, mixture of electric and pedal vehicles, or combination of electric and pedal auxiliary vehicles, especially to a bicycle capable of being pedaled bidirectionally and driven to move in unidirectional.

(b) Description of the Prior Art

The rider on the conventional bicycle always pedals at constant direction, and the related muscles and joints are constantly used during the pedaling period, i.e. some muscles and joints of the rider's body are constantly used and stressed, and the others are constantly unused and released, overall, the human load is uneven, the rider is easily fatigued, and exercise injury is caused by frequently pedaling.

SUMMARY OF THE INVENTION

The retrograde torque limit bicycle with bidirectional input and one-way output of the present invention is a human input device with dual rotary directions input, in which the output terminal thereof connects to the input terminal of a retrograde torque limit transmission with bidirectional input and one-way output, the constant rotary direction output through the output terminal of the retrograde torque limit transmission with bidirectional input and one-way output to drive a load wheel set; the rider chooses the direction of driving input, and makes constant rotary direction output with same or different speed ratio at different driven input direction to drive the load wheel set, and when the load wheel set moves backwards, i.e. reverse drive caused by back move occurs at the output terminal, and the torque exceeds the set overload torque of the torque limit transmission, through the torque limit transmission being transferred into overload sliding or disengaging status, the retrograde torque limit bicycle with bidirectional input and one-way output is prevented from being locked.

Figure 1:
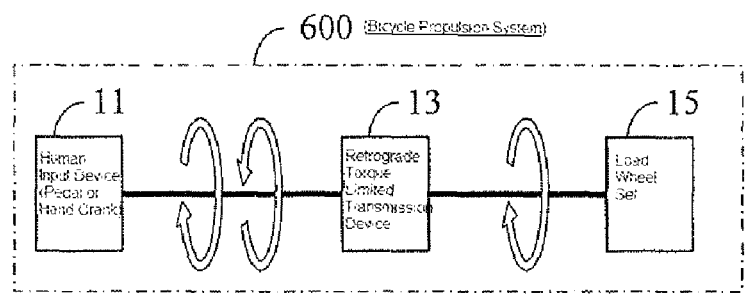
FIG. 1 is a schematic view showing the basic component blocks of the retrograde torque limit bicycle with bidirectional input and one-way output, according to the present invention.

DESCRIPTION OF MAIN COMPONENT SYMBOLS (11): Human input device
(12): Bugtriebwerk
(13): Retrograde torque limit transmission with bidirectional input and one-way output
(14): Rear transmission
(15): Load wheel set
(80): Torque limit transmission
(200): Planetary wheel support arm annular shelf
(201): Planetary wheel shaft
(202): Sun wheel
(203): Planetary wheel
(204): Outer wheel
(301), (302), (303), (305): One-way transmission
(400): Epicyclic gear support arm annular shelf
(401): Epicyclic gear shaft
(402): Inner bevel wheel
(403): Epicyclic gear
(404): Outer bevel wheel
(500): Shell of the transmission gear train
(600): Machine body (602), (603), (605), (606), (615), (616), (617): Driving wheel
(604), (618): Revolving shaft
(607): Transmission belt
(2000): Input shaft
(3000): Output shaft

DETAILED DESCRIPTION OF THE PREFERRED EMBODIMENTS

The retrograde torque limit bicycle with bidirectional input and one-way output of the present invention drives the input terminal of the human input device at forward or reverse dual rotary directions through human's foot, and then the output terminal of the human input device transmits the kinetic energy to the input terminal of the retrograde torque limit transmission with bidirectional input and one-way output, and the output terminal of the retrograde torque limit transmission with bidirectional input and one-way output produces constant rotary direction output to drive the load wheel set, and further to drive the vehicle integrated with the load wheel set; the present invention is applied to pedal vehicles, or mixture of electric and pedal vehicles, or combination of electric and pedal auxiliary vehicles, especially to a bicycle capable of being pedaled bidirectionally and driven to move in unidirectional, for human's lower limbs pedaling at bi-direction to extend and change the muscle groups, thus achieving the following advantages:

(1) reducing the injured caused by some muscles and joints overused; and (2) employing or training the unused muscles and joints.

The present invention relates to a human input device with dual rotary directions input, in which the output terminal of the device is used to transmit the kinetic energy to the input terminal of the specific retrograde torque limit transmission with bidirectional input and one-way output, and the output terminal of the retrograde torque limit transmission with bidirectional input and one-way output produces constant rotary direction output to drive the load wheel set, and further to drive the vehicle integrated with the load wheel set; the rider selects the direction of pedal-driven input, and the retrograde torque limit transmission with bidirectional input and one-way output produces constant rotary direction output with same or different speed ratio at different driven input directions; and when the load wheel set moves back, the reverse drive caused by back move occurs at output terminal, and when the torque exceeds the set overload torque of the torque limit transmission, through the torque limit transmission being transferred into overload sliding or disengaging status, the retrograde torque limit bicycle with bidirectional input and one-way output is prevented from being locked.

FIG. 1 is a schematic view showing the basic component blocks of the retrograde torque limit bicycle with bidirectional input and one-way output, according to the present invention.

As shown in FIG. 1, the retrograde torque limit bicycle with bidirectional input and one-way output, except for the components of the pedal vehicle and a machine body (600), the main components include:

human input device (11): constituted by an output mechanism with dual rotary directions, which receives forward or reverse rotary driven input or reciprocating driven input from human's foot to produce forward or reverse rotation, including a pedal, a crank, and a driving wheel set with dual rotary directions, or a handle, a hand shank, and a driving wheel set with dual rotary directions, i.e. dual rotary directions mechanism driven by human power; in which the kinetic energy of the first driving rotary direction and the input kinetic energy of the second driving rotary direction are derived from human's foot for driving the input terminal of the human input device (11);

the first driving rotary direction and the second driving rotary direction are reverse;

the retrograde torque limit transmission with bidirectional input and one-way output (13): which is driven by different rotary direction kinetic energy from the human input device (11), and outputs constant rotary direction kinetic energy; when reverse drive caused by back move occurs at the output terminal, and the torque exceeds the set overload torque of the torque limit transmission, through the torque limit transmission (80) being transferred into overload sliding or disengaging status to prevent from being locked;

load wheel set (15): directly driven by the output terminal of the retrograde torque limit transmission with bidirectional input and one-way output (13), and further to drive a vehicle integrated with the load wheel set (15).

Figure 2:
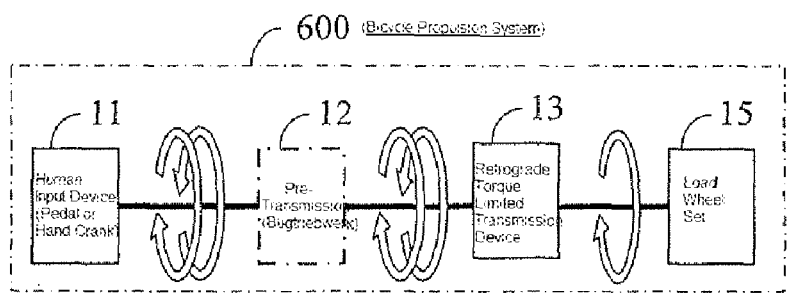
FIG. 2 is a schematic view showing the driving device component blocks, in which a bugtriebwerk (12) is additionally installed between a human input device (11) and a retrograde torque limit transmission with bidirectional input and one-way output (13) in FIG. 1.

The retrograde torque limit bicycle with bidirectional input and one-way output, if it is driven through the human input device (11) by human's foot at the first driving rotary direction, or at the second rotary direction with different rotary direction from the first driving rotary direction, the rotary kinetic energy output from the output terminal of the human input device (11) is transmitted to the input terminal of the retrograde torque limit transmission with bidirectional input and one-way output (13) via the additionally installed bugtriebwerk (12), and the output terminal of the retrograde torque limit transmission with bidirectional input and one-way output (13) outputs the rotary kinetic energy with constant rotary direction to drive the load wheel set (15), and to further drive a vehicle integrated with the load wheel set (15);

FIG. 2 is a schematic view showing the driving device component blocks, in which a bugtriebwerk (12) is additionally installed between a human input device (11) and a retrograde torque limit transmission with bidirectional input and one-way output (13) in FIG. 1.

As shown in FIG. 2, the retrograde torque limit bicycle with bidirectional input and one-way output of the present invention, except for the components of the pedal vehicle and the machine body (600), the main components include:

human input device (11): constituted by an output mechanism with dual rotary directions, which receives forward or reverse rotary driven input or reciprocating driven input from human's foot to produce forward or reverse rotation, including a pedal, a crank, and a driving wheel set with dual rotary directions, or a handle, a hand shank, and a driving wheel set with dual rotary directions, i.e. a human power driven dual rotary directions driving mechanism; in which the kinetic energy of the first driving rotary direction and the input kinetic energy of the second driving rotary direction are derived from human's foot for driving the input terminal of the human input device (11);

the first driving rotary direction and the second driving rotary direction are reverse;

bugtriebwerk (12): constituted by one or more of the following transmissions including various rotary transmission functional structures, such as gear type, belt type, or friction-type, with constant speed ratio or variable speed ratio; in which the bugtriebwerk (12) is driven by the human input device (11) and outputs rotary kinetic energy for driving the retrograde torque limit transmission with bidirectional input and one-way output (13);

the retrograde torque limit transmission with bidirectional input and one-way output (13): which is driven by different rotary direction kinetic energy from the bugtriebwerk (12), and outputs constant rotary direction kinetic energy; when reverse drive caused by back move occurs at the output terminal, and the torque exceeds the set overload torque of the torque limit transmission, through the torque limit transmission (80) being transferred into overload sliding or disengaging status to prevent from being locked;

load wheel set (15): directly driven by the output terminal of the retrograde torque limit transmission with bidirectional input and one-way output (13), and further to drive a vehicle integrated with the load wheel set (15).

Figure 3:
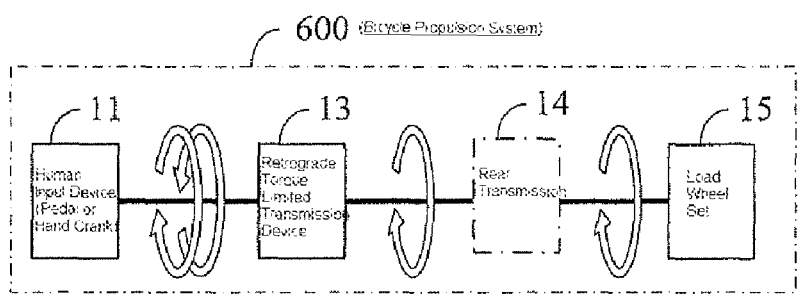
FIG. 3 is a schematic view showing the driving device component blocks, in which a rear transmission (14) is additionally installed between the retrograde torque limit transmission with bidirectional input and one-way output (13) and a load wheel set (15) in FIG. 1.

The retrograde torque limit bicycle with bidirectional input and one-way output of the present invention, the rotary kinetic energy output from the output terminal of the human input device (11) forward or reverse driven by human's foot is transmitted to the retrograde torque limit transmission with bidirectional input and one-way output (13), and then is output in constant rotary direction from the output terminal of the retrograde torque limit transmission with bidirectional input and one-way output (13), and the kinetic energy in constant rotary direction is then via the additionally installed rear transmission to drive the load wheel set (15), and to further drive a vehicle integrated with the load wheel set (15);

FIG. 3 is a schematic view showing the driving device component blocks, in which a rear transmission (14) is additionally installed between the retrograde torque limit transmission with bidirectional input and one-way output (13) and a load wheel set (15) in FIG. 1.

As shown in FIG. 3, the retrograde torque limit bicycle with bidirectional input and one-way output of the present invention, except for the components of the pedal vehicle and the machine body (600), the main components include:

human input device (11): constituted by an output mechanism with dual rotary directions, which receives forward or reverse rotary driven input or reciprocating driven input from human's foot to produce forward or reverse rotation, including a pedal, a crank, and a driving wheel set with dual rotary directions, or a handle, a hand shank, and a driving wheel set with dual rotary directions, i.e. a human power driven dual rotary directions driving mechanism; in which the kinetic energy of the first driving rotary direction and the input kinetic energy of the second driving rotary direction are derived from human's foot for driving the input terminal of the human input device (11);

the first driving rotary direction and the second driving rotary direction are reverse;

the retrograde torque limit transmission with bidirectional input and one-way output (13): which is driven by different rotary direction kinetic energy from the human input device (11) through the bugtriebwerk (12), and outputs constant rotary direction kinetic energy; when reverse drive caused by back move occurs at the output terminal, through the torque limit transmission (80) being released, and the torque exceeds the set overload torque of the torque limit transmission, through the torque limit transmission (80) being transferred into overload sliding or disengaging status, to prevent from being locked;

rear transmission (14): constituted by one or more of the following transmissions including various rotary transmission functional structures, such as gear type, belt type, or friction-type, with constant speed ratio or variable speed ratio, for being driven by the retrograde torque limit transmission with bidirectional input and one-way output (13), and its output terminal is used to drive the load wheel set (15); and load wheel set (15): directly driven by the output terminal of the rear transmission (14), and further to drive a vehicle integrated with the load wheel set (15).

Figure 4:
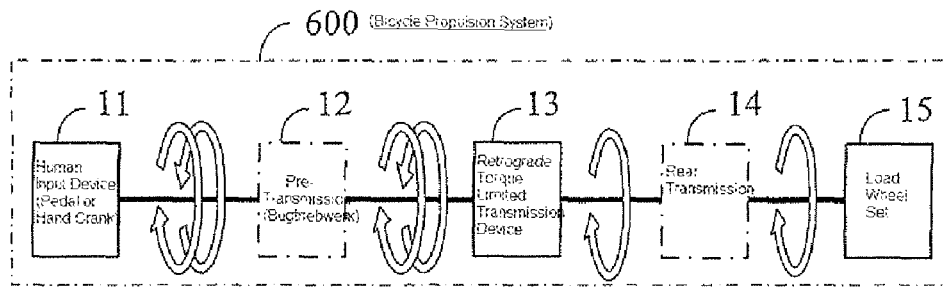
FIG. 4 is a schematic view showing the driving device component blocks, in which the bugtriebwerk (12) is additionally installed between the human input device (11) and the retrograde torque limit transmission with bidirectional input and one-way output (13), and the rear transmission (14) is additionally installed between the retrograde torque limit transmission with bidirectional input and one-way output (13) and the load wheel set (15) in FIG. 1.

The retrograde torque limit bicycle with bidirectional input and one-way output of the present invention, it is forward or reverse driven through the human input device (11) by human's foot, and the output terminal outputs rotary kinetic energy for transmitting to the input terminal of the retrograde torque limit transmission with bidirectional input and one-way output (13) through the additionally installed bugtriebwerk (12), and then the output terminal of the retrograde torque limit transmission with bidirectional input and one-way output (13) outputs constant rotary direction output to drive the load wheel set (15) through the additionally installed rear transmission (14), and to further drive a vehicle integrated with the load wheel set (15);

FIG. 4 is a schematic view showing the driving device component blocks, in which the bugtriebwerk (12) is additionally installed between the human input device (11) and the retrograde torque limit transmission with bidirectional input and one-way output (13), and the rear transmission (14) is additionally installed between the retrograde torque limit transmission with bidirectional input and one-way output (13) and the load wheel set (15) in FIG. 1.

As shown in FIG. 4, the retrograde torque limit bicycle with bidirectional input and one-way output of the present invention, except for the components of the pedal vehicle and the machine body (600), the main components include:

human input device (11): constituted by an output mechanism with dual rotary directions, which receives forward or reverse rotary driven input or reciprocating driven input from human's foot to produce forward or reverse rotation, including a pedal, a crank, and a driving wheel set with dual rotary directions, or a handle, a hand shank, and a driving wheel set with dual rotary directions, i.e. a human power driven dual rotary directions driving mechanism; in which the kinetic energy of the first driving rotary direction and the input kinetic energy of the second driving rotary direction are derived from human's foot for driving the input terminal of the human input device (11);

the first driving rotary direction and the second driving rotary direction are reverse;

bugtriebwerk (12): constituted by one or more of the following transmissions including various rotary transmission functional structures, such as gear type, belt type, or friction-type, with constant speed ratio or variable speed ratio; in which the bugtriebwerk (12) is driven by the human input device (11) and outputs rotary kinetic energy for driving the retrograde torque limit transmission with bidirectional input and one-way output (13);

the retrograde torque limit transmission with bidirectional input and one-way output (13): which is driven by different rotary direction kinetic energy from the bugtriebwerk (12), and outputs constant rotary direction kinetic energy; when reverse drive caused by back move occurs at the output terminal, through the torque limit transmission (80) being released, and the torque exceeds the set overload torque of the torque limit transmission, through the torque limit transmission (80) being transferred into overload sliding or disengaging status, to prevent from being locked;

rear transmission (14): constituted by one or more of the following transmissions including various rotary transmission functional structures, such as gear type, belt type, or friction-type, with constant speed ratio or variable speed ratio, for being driven by the retrograde torque limit transmission with bidirectional input and one-way output (13), and its output terminal is used to drive the load wheel set (15); and load wheel set (15): directly driven by the output terminal of the rear transmission (14), and further to drive a vehicle integrated with the load wheel set (15).

The retrograde torque limit bicycle with bidirectional input and one-way output of the present invention, except for the related components and machine body of the vehicle driven and the load wheel set are installed, it is also characterized in the function of retrograde torque limit with the bidirectional input and one-way output, and the components and operational features of the retrograde torque limit transmission with bidirectional input and one-way output (13) are provided for describing the feasibility; in which except for the shell, revolving shaft, and bearing, the main components of the retrograde torque limit transmission with bidirectional input and one-way output (13) installed within the retrograde torque limit bicycle with bidirectional input and one-way output include:

internal transmission components are constituted by one or more of the followings integrated with the torque limit transmission (80), including (1) gear set; and/or (2) friction wheel set; and/or (3) chain and sprocket section; and/or (4) belt and pulley section; and/or (5) transmission crank and wheels set; and/or (6) fluid transmission unit; and/or (7) electromagnetic force actuator;

when the retrograde torque limit transmission with bidirectional input and one-way output (13) is driven through being input the first driving rotary direction and the second driving rotary direction, which are different rotary directions, the speed ratio between the input terminal and the output terminal with constant rotary direction is the same, different, or variable;

in the gear train structure with dual rotary directions input and constant rotary direction output of the retrograde torque limit transmission with bidirectional input and one-way output (13), the radial or axial torque limit transmission (80) is installed at one or more of the following positions, including: installed between the machine body and the rotatable shell of the gear train with bidirectional input and one-way output; or installed between the fixed shell and the rotating parts of the gear train with bidirectional input and one-way output; or installed between the transmissions in the power transmission chain from the input terminal to the output terminal of the retrograde torque limit transmission with bidirectional input and one-way output (13);

torque limit transmission (80): related to a mechanism driven by human power, or machine power, or aerodynamic force, or fluid power, or electromagnetic force to be connected, and to be transferred into overload sliding or disengaging status when exceeding the set torque;

the operational features of the retrograde torque limit transmission with bidirectional input and one-way output (13) are as following:

the first rotary direction and the second rotary direction for driving the input terminal of the retrograde torque limit transmission with bidirectional input and one-way output (13) are reverse;

when the input terminal is driven by the first rotary direction, it is via the first transmission gear train to drive the output terminal to produce the first rotary direction output;

when the input terminal is driven by the second rotary direction, it is via the second transmission gear train to drive the output terminal to produce the first rotary direction output;

an one-way transmission is installed between the first transmission gear train and the second transmission gear train to avoid the interference from the second transmission gear train when the first transmission gear train is used to be the first rotary direction input and produces the first rotary direction output;

an one-way transmission is installed between the second transmission gear train and the first transmission gear train to avoid the interference from the first transmission gear train when the second transmission gear train is used to be the second rotary direction input and produces the first rotary direction output;

by way of the torque limit transmission (80) installed at the retrograde torque limit transmission with bidirectional input and one-way output (13), if the input side is driven by the output side at reverse rotary direction, the torque limit transmission (80) is controlled to eliminate the structural shortcoming of the gear train with bidirectional input and one-way output at rigid lock status, i.e. for the gear train with bidirectional input and one-way output, if the input side is driven by the output side at reverse rotary direction, and the torque exceeds the set overload torque of the torque limit transmission, the torque limit transmission (80) is controlled to transfer into overload sliding or disengaging status, to prevent from rigid lock status.

Figure 5:
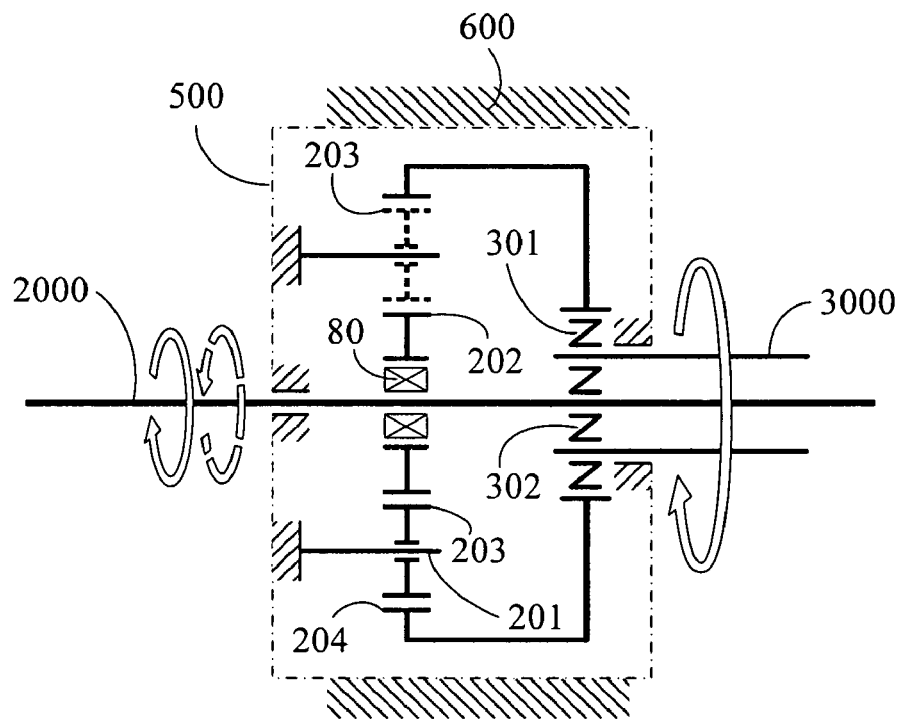
FIG. 5 is a schematic structural view showing the first embodiment of the retrograde torque limit transmission with bidirectional input and one-way output (13).
Figure 6:
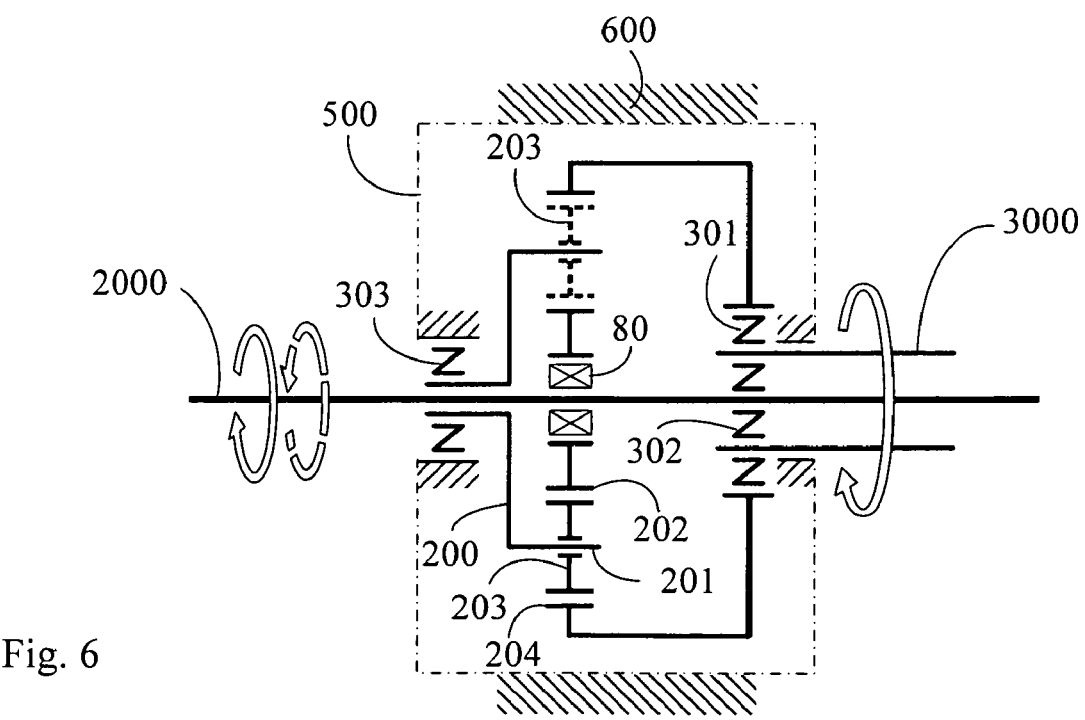
FIG. 6 is a schematic structural view showing the second embodiment of the retrograde torque limit transmission with bidirectional input and one-way output (13).
Figure 7:
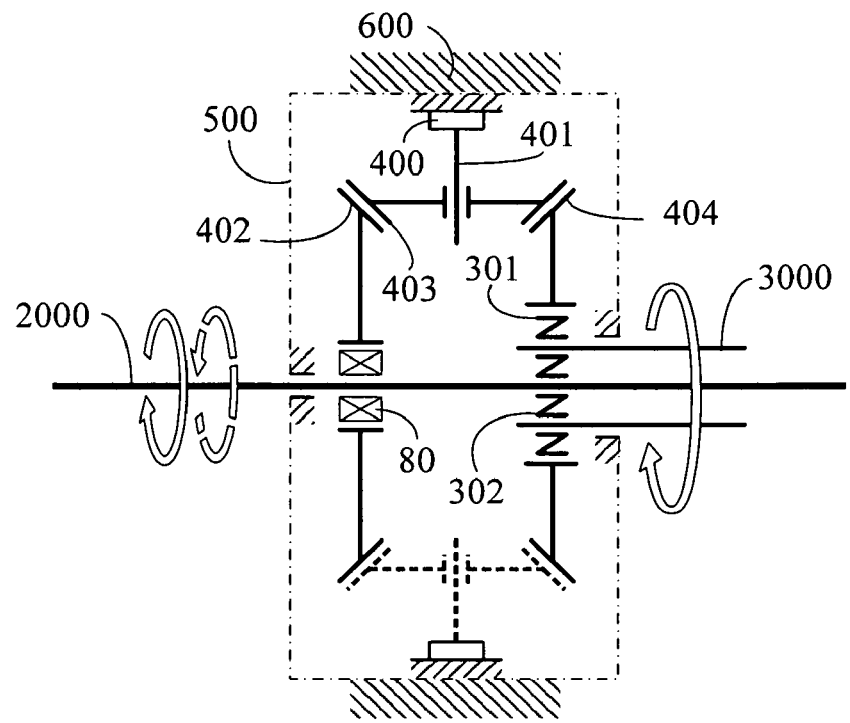
FIG. 7 is a schematic structural view showing the third embodiment of the retrograde torque limit transmission with bidirectional input and one-way output (13).
Figure 8:
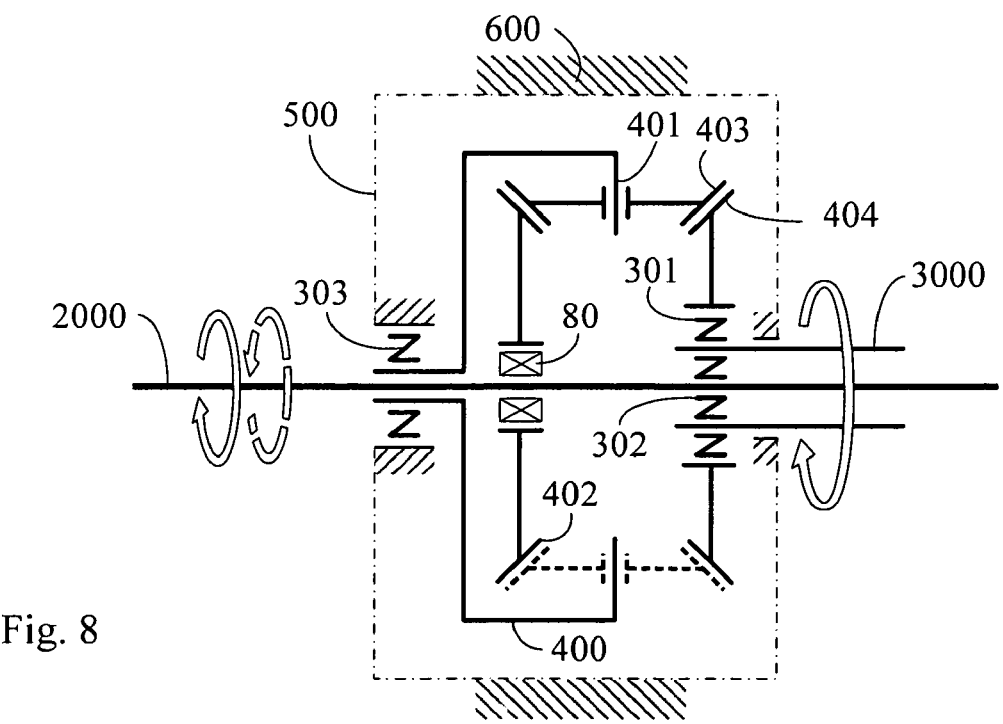
FIG. 8 is a schematic structural view showing the 4th embodiment of the retrograde torque limit transmission with bidirectional input and one-way output (13).

In the retrograde torque limit bicycle with bidirectional input and one-way output, the embodiments of the retrograde torque limit transmission with bidirectional input and one-way output (13) used are shown as FIGS. 5 to 12, including:

A) as shown in FIGS. 5 to 6, which is constituted by a planetary gear train;

B) as shown in FIGS. 7 to 8, which is constituted by an epicyclic gear train; and C) as shown in FIGS. 9 to 12, which is integrated constituted by a transmission with different transmission rotary direction.

FIG. 5 is a schematic structural view showing the first embodiment of the retrograde torque limit transmission with bidirectional input and one-way output (13).

As shown in FIG. 5, the retrograde torque limit transmission with bidirectional input and one-way output (13) is constituted by the planetary gear train with the input shaft and the output shaft coaxial fitting, the main components including:

one end of the input shaft (2000) is through installed at one side of the shell of the transmission gear train (500) via a bearing structure, while the other end of the input shaft (2000) perforates through the output shaft (3000) via the one-way transmission (302), and a bearing is installed between the output shaft (3000) and the shell of the transmission gear train (500);

torque limit transmission (80): related to a mechanism driven by human power, or machine power, or aerodynamic force, or fluid power, or electromagnetic force to be connected, and be transferred into overload sliding or disengaging status when exceeding the set torque;

shell of the transmission gear train (500): machine parts installed for constituting the clutch control reversible transmission wheel system with bidirectional input and one-way output;

machine body (600): a relatively static mechanism structure;

the input shaft (2000) is integrated with the sun wheel (202) via the torque limit transmission (80);

the planetary wheel (203) is installed between the outer wheel (204) and the sun wheel (202); the center of the planetary wheel (203) rotates at the planetary wheel shaft (201), one end of the planetary wheel shaft (201) is fixed at the shell of the transmission gear train (500);

the shell of the transmission gear train (500) is fixed installed at the machine body (600);

an one-way transmission (301) is installed between the ring structure of the outer wheel (204) and the output shaft (3000);

the sun wheel (202), the planetary wheel (203), and the outer wheel (204) are constituted by gears or friction wheels;

the relation of the transmission ratio using the sun wheel (202) to drive the planetary wheel (203) includes acceleration, deceleration, or constant velocity;

the relation of the transmission ratio of using the planetary wheel (203) to drive the outer wheel (204) includes acceleration, deceleration, or constant velocity;

by way of the above structure, the input shaft (2000) is driven at the first rotary direction, and then through the one-way transmission (302) for driving the output shaft (3000) to produce the first rotary direction output to constitute the first transmission gear train;

by way of the above structure, if the torque limit transmission (80) is connected, the input shaft (2000) is driven at the second rotary direction, and then through the sun wheel (202) for further driving the planetary wheel (203) and the outer wheel (204), and through the ring structure of the outer wheel (204) and the one-way transmission (301) for driving the output shaft (3000) to produce the first rotary direction output to constitute the second transmission gear train; and when reverse drive caused by back move occurs at the output shaft (3000), and the torque exceeds the set overload torque of the torque limit transmission, the torque limit transmission (80) is transferred into overload sliding or disengaging status.

FIG. 6 is a schematic structural view showing the second embodiment of the retrograde torque limit transmission with bidirectional input and one-way output (13).

As shown in FIG. 6, the retrograde torque limit transmission with bidirectional input and one-way output (13) is constituted by the planetary gear train with the input shaft and the output shaft coaxial fitting, the main components including:

one end of the input shaft (2000) is through installed at one side of the shell of the transmission gear train (500) via the rotational structure of the planetary wheel support arm annular shelf (200) and the one-way transmission (303), while the other end of the input shaft (2000) perforates through the output shaft (3000) via the one-way transmission (302), and a bearing is installed between the output shaft (3000) and the shell of the transmission gear train (500);

torque limit transmission (80): related to a mechanism driven by human power, or machine power, or aerodynamic force, or fluid power, or electromagnetic force to be connected, and be transferred into overload sliding or disengaging status when exceeding the set torque;

shell of the transmission gear train (500): machine parts installed for constituting the clutch control reversible transmission wheel system with bidirectional input and one-way output;

machine body (600): a relatively static mechanism structure;

the input shaft (2000) is integrated with the sun wheel (202) via the torque limit transmission (80);

the planetary wheel (203) is installed between the outer wheel (204) and the sun wheel (202); the center of the planetary wheel (203) rotates at the planetary wheel shaft (201), one end of the planetary wheel shaft (201) is integrated with the planetary wheel support arm annular shelf (200), and the planetary wheel support arm annular shelf (200) rotates between the input shaft (2000) and the one-way transmission (303);

the shell of the transmission gear train (500) is fixed installed at the machine body (600);

an one-way transmission (301) is installed between the ring structure of the outer wheel (204) and the output shaft (3000);

the sun wheel (202), the planetary wheel (203), and the outer wheel (204) are constituted by gears or friction wheels;

the relation of the transmission ratio using the sun wheel (202) to drive the planetary wheel (203) includes acceleration, deceleration, or constant velocity;

the relation of the transmission ratio using the planetary wheel (203) the outer wheel (204) includes acceleration, deceleration, or constant velocity;

by way of the above structure, the input shaft (2000) is driven at the first rotary direction, and then through the one-way transmission (302) for driving the output shaft (3000) to produce the first rotary direction output to constitute the first transmission gear train;

by way of the above structure, if the torque limit transmission (80) is connected, the input shaft (2000) is driven at the second rotary direction, and then through the sun wheel (202) for further driving the planetary wheel (203) and the outer wheel (204), and through the ring structure of the outer wheel (204) and the one-way transmission (301) for driving the output shaft (3000) to produce the first rotary direction output to constitute the second transmission gear train; and when reverse drive caused by back move occurs at the output shaft (3000), and the torque exceeds the set overload torque of the torque limit transmission, the torque limit transmission (80) is transferred into overload sliding or disengaging status.

FIG. 7 is a schematic structural view showing the third embodiment of the retrograde torque limit transmission with bidirectional input and one-way output (13).

As shown in FIG. 7, the retrograde torque limit transmission with bidirectional input and one-way output (13) is constituted by the epicyclic gear train with the input shaft and the output shaft coaxial fitting, the main components including:

one end of the input shaft (2000) is through installed at one side of the shell of the transmission gear train (500) via a bearing structure, while the other end of the input shaft (2000) perforates through the output shaft (3000) via the one-way transmission (302), and a bearing is installed between the output shaft (3000) and the shell of the transmission gear train (500);

torque limit transmission (80): related to a mechanism driven by human power, or machine power, or aerodynamic force, or fluid power, or electromagnetic force to be connected, and be transferred into overload sliding or disengaging status when exceeding the set torque;

shell of the transmission gear train (500): machine parts installed for constituting the clutch control reversible transmission wheel system with bidirectional input and one-way output;

machine body (600): a relatively static mechanism structure;

the input shaft (2000) is integrated with the inner bevel wheel (402) via the torque limit transmission (80);

the epicyclic gear (403) installed between the outer bevel wheel (404) and the inner bevel wheel (402); the center of the epicyclic gear (403) rotates at the epicyclic gear shaft (401), one end of the epicyclic gear shaft (401) is integrated with the epicyclic gear support arm annular shelf (400), the epicyclic gear support arm annular shelf (400) is fixed at the shell of the transmission gear train (500);

the shell of the transmission gear train (500) is fixed installed at the machine body (600);

the one-way transmission (301) is installed between the outer bevel wheel (404) and the output shaft (3000);

the inner bevel wheel (402), the epicyclic gear (403), and the outer bevel wheel (404) are constituted by gears or friction wheels;

the relation of the transmission ratio using the inner bevel wheel (402) to drive the epicyclic gear (403) acceleration, deceleration, or constant velocity;

the relation of the transmission ratio using the epicyclic gear (403) to drive the outer bevel wheel (404) includes acceleration, deceleration, or constant velocity;

by way of the above structure, the input shaft (2000) is driven at the first rotary direction, and then through the one-way transmission (302) for driving the output shaft (3000) to produce the first rotary direction output to constitute the first transmission gear train;

by way of the above structure, if the torque limit transmission (80) is connected, the input shaft (2000) is driven at the second rotary direction, and then through the inner bevel wheel (402) for further driving the epicyclic gear (403) and the outer bevel wheel (404), and through the outer bevel wheel (404) and the one-way transmission (301) for driving the output shaft (3000) to produce the first rotary direction output to constitute the second transmission gear train; and when reverse drive caused by back move occurs at the output shaft (3000), and the torque exceeds the set overload torque of the torque limit transmission, the torque limit transmission (80) is transferred into overload sliding or disengaging status.

FIG. 8 is a schematic structural view showing the 4th embodiment of the retrograde torque limit transmission with bidirectional input and one-way output (13).

As shown in FIG. 8, the retrograde torque limit transmission with bidirectional input and one-way output (13) is constituted by the epicyclic gear train with the input shaft and the output shaft coaxial fitting, the main components including:

one end of the input shaft (2000) is through installed at the epicyclic gear support arm annular shelf (400) via a bearing structure, the epicyclic gear support arm annular shelf (400) is integrated with one side of the shell of the transmission gear train (500) via the one-way transmission (303), while the other end of the input shaft (2000) perforates through the output shaft (3000) via the one-way transmission (302), and a bearing is installed between the output shaft (3000) and the shell of the transmission gear train (500);

torque limit transmission (80): related to a mechanism driven by human power, or machine power, or aerodynamic force, or fluid power, or electromagnetic force to be connected, and be transferred into overload sliding or disengaging status when exceeding the set torque;

shell of the transmission gear train (500): machine parts installed for constituting the clutch control reversible transmission wheel system with bidirectional input and one-way output;

machine body (600): a relatively static mechanism structure;

the input shaft (2000) is integrated with the inner bevel wheel (402) via the torque limit transmission (80);

the epicyclic gear (403) installed between the outer bevel wheel (404) and the inner bevel wheel (402); the center of the epicyclic gear (403) rotates at the epicyclic gear shaft (401), the epicyclic gear shaft (401) is integrated with the epicyclic gear support arm annular shelf (400), and the epicyclic gear support arm annular shelf (400) rotates between the input shaft (2000) and the one-way transmission (303);

the shell of the transmission gear train (500) is fixed installed at the machine body (600);

the outer bevel wheel (404) is surrounded installed to the output shaft (3000) via the one-way transmission (301);

the inner bevel wheel (402), the epicyclic gear (403), and the outer bevel wheel (404) are constituted by gears or friction wheels;

the relation of the transmission ratio using the inner bevel wheel (402) to drive the epicyclic gear (403) includes acceleration, deceleration, or constant velocity;

the relation of the transmission ratio using the epicyclic gear (403) to drive the outer bevel wheel (404) includes acceleration, deceleration, or constant velocity;

by way of the above structure, the input shaft (2000) is driven at the first rotary direction, and then through the one-way transmission (302) for driving the output shaft (3000) to produce the first rotary direction output to constitute the first transmission gear train;

by way of the above structure, if the torque limit transmission (80) is connected, the input shaft (2000) is driven at the second rotary direction, and then through the inner bevel wheel (402), the epicyclic gear (403), and the outer bevel wheel (404), and further through the one-way transmission (301) for driving the output shaft (3000) to produce the first rotary direction output to constitute the second transmission gear train; and when reverse drive caused by back move occurs at the output shaft (3000), and the torque exceeds the set overload torque of the torque limit transmission, the torque limit transmission (80) is transferred into overload sliding or disengaging status.

Figure 9:
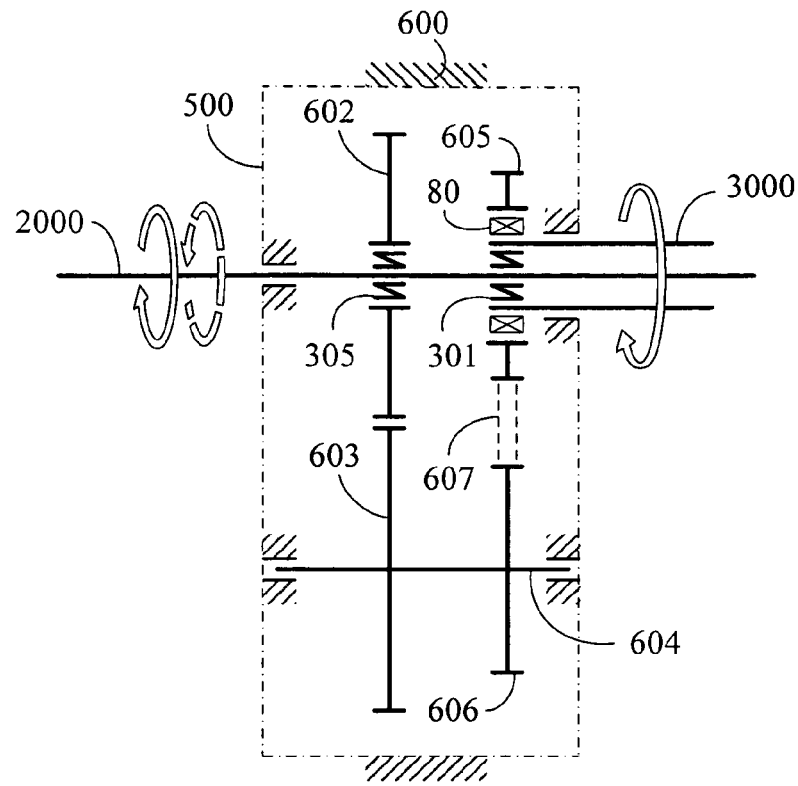
FIG. 9 is a schematic structural view showing the 5th embodiment of the retrograde torque limit transmission with bidirectional input and one-way output (13).

FIG. 9 is a schematic structural view showing the 5th embodiment of the retrograde torque limit transmission with bidirectional input and one-way output (13).

As shown in FIG. 9, the retrograde torque limit transmission with bidirectional input and one-way output (13) is constituted by integrating with the transmissions with different drive rotary directions with the input shaft and the output shaft coaxial fitting, the main components including:

one end of the input shaft (2000) is through installed at one side of the shell of the transmission gear train (500) via a bearing structure, while the other end of the input shaft (2000) perforates through the output shaft (3000) via the one-way transmission (301), and a bearing is installed between the output shaft (3000) and the shell of the transmission gear train (500);

torque limit transmission (80): related to a mechanism driven by human power, or machine power, or aerodynamic force, or fluid power, or electromagnetic force to be connected, and be transferred into overload sliding or disengaging status when exceeding the set torque;

shell of the transmission gear train (500): machine parts installed for constituting the clutch control reversible transmission wheel system with bidirectional input and one-way output;

machine body (600): a relatively static mechanism structure;

the input shaft (2000) perforates through the one-way transmission (305), and then integrated with the driving wheel (602);

the rotary direction of the driving wheel (602) being different from that of the driving wheel (603), the driving wheel (603) and the driving wheel (606) are co-integrated with the revolving shaft (604), and a bearing is installed between the revolving shaft (604) and the shell of the transmission gear train (500);

the driving wheel (605) and the driving wheel (606) are constituted by the pulley or the sprocket, which are transmitted by the transmission belt (607), to constitute a driving wheel set with the same rotary direction;

the torque limit transmission (80) is installed between the driving wheel (615) and the output shaft (3000);

the shell of the transmission gear train (500) is fixed installed at the machine body (600);

the driving wheels (602) and (603) are constituted by gears or friction wheels;

the relation of the transmission ratio in the driving wheel set with different rotary directions includes acceleration, deceleration, or constant velocity;

the relation of the transmission ratio in the driving wheel set with the same rotary direction includes acceleration, deceleration, or constant velocity;

the driving wheel set with the same rotary direction includes equipped with the transmission belt, pulley (such as toothed belt or steel belt), or equipped with the sprocket with chain;

by way of the above structure, the input shaft (2000) is driven at the first rotary direction, and then through the one-way transmission (301) for driving the output shaft (3000) to produce the first rotary direction output to constitute the first transmission gear train;

by way of the above structure, if the torque limit transmission (80) is connected, the input shaft (2000) is driven at the second rotary direction, and then through the one-way transmission (305) driving the driving wheel (602), and then the driving wheel (602) driving the driving wheel (603) and the driving wheel (606), and through the driving wheel (606) driving the driving wheel (605) and via the torque limit transmission (80) for driving the output shaft (3000) to produce the first rotary direction output to constitute the second transmission gear train; and when reverse drive caused by back move occurs at the output shaft (3000), and the torque exceeds the set overload torque of the torque limit transmission, the torque limit transmission (80) is transferred into overload sliding or disengaging status.

Figure 10:
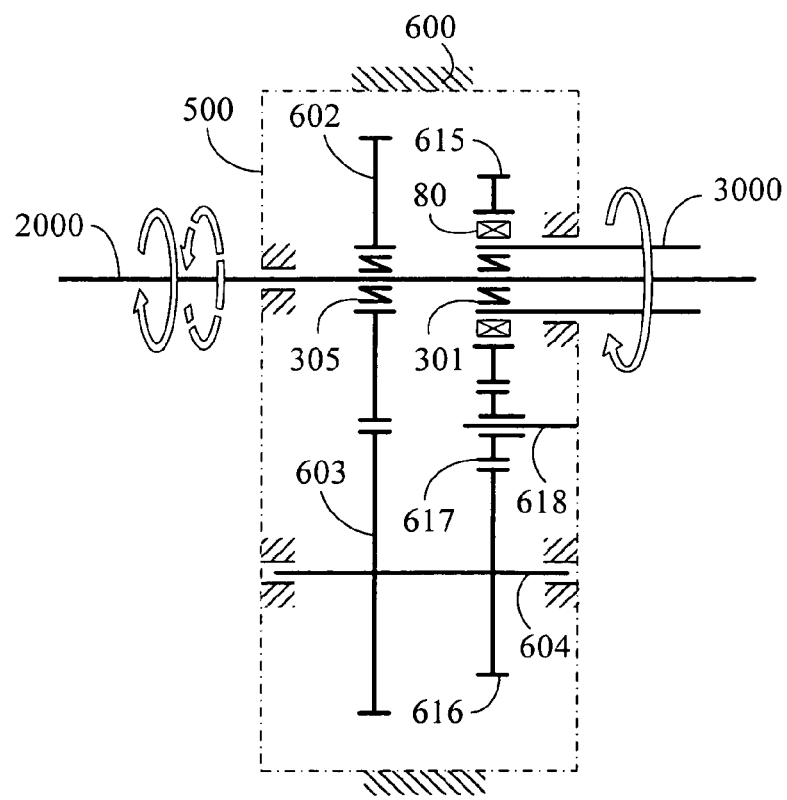
FIG. 10 is a schematic structural view showing the 6th embodiment of the retrograde torque limit transmission with bidirectional input and one-way output (13).

FIG. 10 is a schematic structural view showing the 6th embodiment of the retrograde torque limit transmission with bidirectional input and one-way output (13).

As shown in FIG. 10, the retrograde torque limit transmission with bidirectional input and one-way output (13) is constituted by integrating with the transmissions with different drive rotary directions with the input shaft and the output shaft coaxial fitting, the main components including:

one end of the input shaft (2000) is through installed at one side of the shell of the transmission gear train (500) via a bearing structure, while the other end of the input shaft (2000) perforates through the output shaft (3000) via the one-way transmission (301), and a bearing is installed between the output shaft (3000) and the shell of the transmission gear train (500);

torque limit transmission (80): related to a mechanism driven by human power, or machine power, or aerodynamic force, or fluid power, or electromagnetic force to be connected, and be transferred into overload sliding or disengaging status when exceeding the set torque;

shell of the transmission gear train (500): machine parts installed for constituting the clutch control reversible transmission wheel system with bidirectional input and one-way output;

machine body (600): a relatively static mechanism structure;

the input shaft (2000) perforates through the one-way transmission (305), and then integrated with the driving wheel (602);

the driving wheel (602) and the driving wheel (603) are in different rotary directions, the driving wheel (603) and the driving wheel (616) are co-integrated with the revolving shaft (604), and a bearing is installed between the revolving shaft (604) and the shell of the transmission gear train (500);

the driving wheel (616) is via the driving wheel (617) rotating at the revolving shaft (618) for driving the driving wheel (615) to constitute a driving wheel set with the same rotary direction;

the revolving shaft (618) is integrated with the shell of the transmission gear train (500);

the torque limit transmission (80) is installed between the driving wheel (615) and the output shaft (3000);

the shell of the transmission gear train (500) is fixed installed at the machine body (600);

the driving wheels (602), (603), (615), (616), and (617) are constituted by gears or friction wheels;

the relation of the transmission ratio in the driving wheel set with different rotary directions includes acceleration, deceleration, or constant velocity;

the relation of the transmission ratio in the driving wheel set with the same rotary direction includes acceleration, deceleration, or constant velocity;

the driving wheel set with the same rotary direction is constituted by the gear set with an idler wheel or by the internal gear set;

by way of the above structure, the input shaft (2000) is driven at the first rotary direction, and then through the one-way transmission (301) for driving the output shaft (3000) to produce the first rotary direction output to constitute the first transmission gear train;

by way of the above structure, if the torque limit transmission (80) is connected, the input shaft (2000) is driven at the second rotary direction, and then through the one-way transmission (305) driving the driving wheel (602), and through the driving wheel (602) driving the driving wheel (603) and the driving wheel (616), and then through the driving wheel (616) via the driving wheel (617) for further driving the driving wheel (615), and then the driving wheel (615) via the torque limit transmission (80) for driving the output shaft (3000) to produce the first rotary direction output to constitute the second transmission gear train; and when reverse drive caused by back move occurs at the output shaft (3000), and the torque exceeds the set overload torque of the torque limit transmission, the torque limit transmission (80) is transferred into overload sliding or disengaging status.

Figure 11:
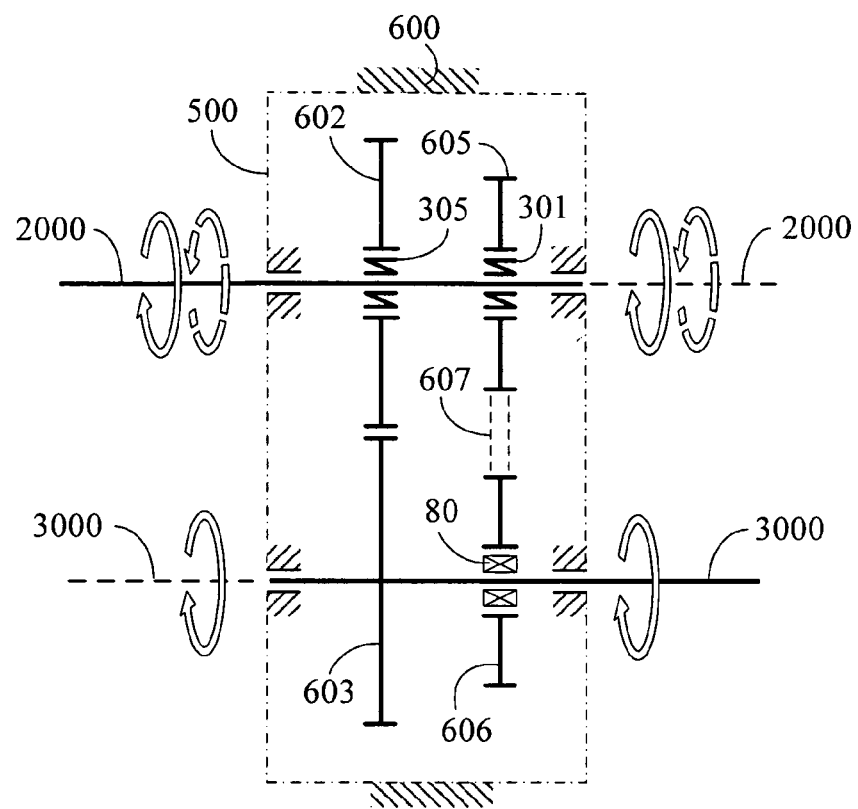
FIG. 11 is a schematic structural view showing the 7th embodiment of the retrograde torque limit transmission with bidirectional input and one-way output (13).

FIG. 11 is a schematic structural view showing the 7th embodiment of the retrograde torque limit transmission with bidirectional input and one-way output (13).

As shown in FIG. 11, the retrograde torque limit transmission with bidirectional input and one-way output (13) is constituted by integrating with the transmissions with different drive rotary directions, in which the input shaft and the output shaft have different axes, the main components including:

- one end of the input shaft (2000) is through installed at one side of the shell of the transmission gear train (500) via a bearing structure, while the other end of the input shaft (2000) perforates through the driving wheel (605) via the one-way transmission (301), a bearing is installed between the other end of the input shaft (2000) and the shell of the transmission gear train (500), and the rotary power source is inputted through one or two ends of the input shaft (2000);
- torque limit transmission (80): related to a mechanism driven by human power, or machine power, or aerodynamic force, or fluid power, or electromagnetic force to be connected, and be transferred into overload sliding or disengaging status when exceeding the set torque;
- shell of the transmission gear train (500): machine parts installed for constituting the clutch control reversible transmission wheel system with bidirectional input and one-way output;
- machine body (600): a relatively static mechanism structure;
- the input shaft (2000) perforates through the one-way transmission (305), and then integrated with the driving wheel (602);
- the driving wheel (602) and the driving wheel (603) are in different rotary directions, the driving wheel (603) is integrated with the output shaft (3000), the driving wheel (606) is integrated with the output shaft (3000) via the torque limit transmission (80), and a bearing is installed between the output shaft (3000) and the shell of the transmission gear train (500);
- the driving wheel (605) and the driving wheel (606) are constituted by the pulley or the sprocket, which are transmitted by the transmission belt (607), to constitute a driving wheel set with the same rotary direction;
- the torque limit transmission (80) is installed between the driving wheel (606) and the output shaft (3000);
- the shell of the transmission gear train (500) is fixed installed at the machine body (600);
- the driving wheels (602) and (603) are constituted by gears or friction wheels;
- the relation of the transmission ratio in the driving wheel set with different rotary directions includes acceleration, deceleration, or constant velocity;
- the relation of the transmission ratio in the driving wheel set with the same rotary direction includes acceleration, deceleration, or constant velocity;
- the driving wheel set with the same rotary direction includes equipped with the transmission belt, pulley (such as toothed belt or steel belt), or equipped with the sprocket with chain;

by way of the above structure, if the torque limit transmission (80) is connected, the input shaft (2000) is driven at the first rotary direction, and then through the one-way transmission (301) for driving the driving wheel (605), and through the transmission belt (607) for driving the driving wheel (606), and further through the torque limit transmission (80) for driving the output shaft (3000) to produce the first rotary direction output to constitute the first transmission gear train;

by way of the above structure, the input shaft (2000) is driven at the second rotary direction, and then through the one-way transmission (305) driving the driving wheel (602), and then the driving wheel (602) driving the driving wheel (603) for driving the output shaft (3000) to produce the first rotary direction output to constitute the second transmission gear train;

when reverse drive caused by back move occurs at the output shaft (3000), and the torque exceeds the set overload torque of the torque limit transmission, the torque limit transmission (80) is transferred into overload sliding or disengaging status;

one or two ends of the output shaft (3000) are arranged for executing output.

Figure 12:
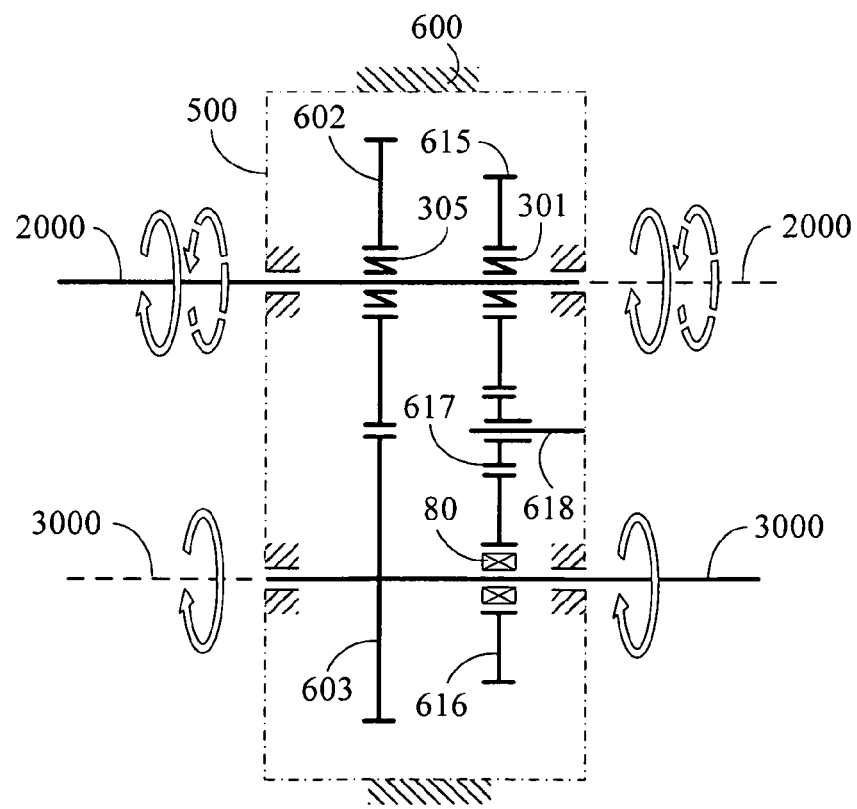
FIG. 12 is a schematic structural view showing the 8th embodiment of the retrograde torque limit transmission with bidirectional input and one-way output (13).

FIG. 12 is a schematic structural view showing the 8th embodiment of the retrograde torque limit transmission with bidirectional input and one-way output (13).

As shown in FIG. 12, the retrograde torque limit transmission with bidirectional input and one-way output (13) is constituted by integrating with the transmissions with different drive rotary directions, in which the input shaft and the output shaft have different axes, the main components including:

- one end of the input shaft (2000) is through installed at one side of the shell of the transmission gear train (500) via a bearing structure, while the other end of the input shaft (2000) perforates through the driving wheel (615) via the one-way transmission (301), a bearing is installed between the other end of the input shaft (2000) and the shell of the transmission gear train (500), and the rotary power source is inputted through one or two ends of the input shaft (2000);
- torque limit transmission (80): related to a mechanism driven by human power, or machine power, or aerodynamic force, or fluid power, or electromagnetic force to be connected, and be transferred into overload sliding or disengaging status when exceeding the set torque;
- shell of the transmission gear train (500): machine parts installed for constituting the clutch control reversible transmission wheel system with bidirectional input and one-way output;
- machine body (600): a relatively static mechanism structure;
- the input shaft (2000) perforates through the one-way transmission (305), and then integrated with the driving wheel (602);
- the driving wheel (615) is through the driving wheel (617) for driving the driving wheel (616), the driving wheel (616) is integrated with the output shaft (3000) via the torque limit transmission (80), and a bearing is installed between the output shaft (3000) and the shell of the transmission gear train (500);
- the driving wheel (617) rotates at the revolving shaft (618), and the revolving shaft (618) is installed at the shell of the transmission gear train (500);
- the driving wheel (602) and the driving wheel (603) are in different rotary directions;
- the driving wheel (603) is integrated with the output shaft (3000);

the shell of the transmission gear train (500) is fixed installed at the machine body (600);

the driving wheels (602), (603), (615), (616), and (617) are constituted by gears or friction wheels;

the relation of the transmission ratio in the driving wheel set with different rotary directions includes acceleration, deceleration, or constant velocity;

the relation of the transmission ratio in the driving wheel set with the same rotary direction includes acceleration, deceleration, or constant velocity;

the driving wheel set with the same rotary direction is constituted by the gear set with an idler wheel or by the internal gear set;

by way of the above structure, the input shaft (2000) is driven at the first rotary direction, and then through the one-way transmission (301) for driving the driving wheel (615), and through the transmission belt (617) for driving the driving wheel (616), and then further through the torque limit transmission (80)in connected status for driving the output shaft (3000) to produce the first rotary direction output to constitute the first transmission gear train;

by way of the above structure, the input shaft (2000) is driven at the second rotary direction, and then through the one-way transmission (305) driving the driving wheel (602), and then through the driving wheel (602) driving the driving wheel (603), and further through the driving wheel (603) driving the output shaft (3000) to produce the first rotary direction output to constitute the second transmission gear train;

when reverse drive caused by back move occurs at the output shaft (3000), and the torque exceeds the set overload torque of the torque limit transmission, the torque limit transmission (80) is transferred into overload sliding or disengaging status; and one or two ends of the output shaft (3000) are arranged for executing output.

The invention claimed is:

1. A bicycle propulsion system with bidirectional input and one-way output, said bicycle propulsion system including a torque limited retrograde transmission device that enables a bicycle to be move backwards without being locking, comprising:
    a human input device for receiving a bidirectional input and transmitting said bidirectional input to said torque limited retrograde transmission, said bidirectional input including inputs in either of two rotary input directions or a reciprocating input; and
    a load wheel set driven by said one-way output of said torque limited retrograde transmission, wherein:
        said torque limited retrograde transmission device converts said bidirectional input into a one-way output to cause said bicycle to move in a forward direction, thereby allowing a rider to move the bicycle in a forward direction while supplying an input in either of the two rotary input directions, and
        said torque limited retrograde transmission device includes a torque limiting component arranged to transfer said torque limited retrograde transmission to a sliding or disengaged status to prevent locking when a reverse torque from reverse movement of the load wheel set exceeds a set overload torque.

2. A bicycle propulsion system as claimed in claim 1, wherein said human input device is a foot pedal or hand-crank driven device.

3. A bicycle propulsion system as claimed in claim 1, wherein a speed ratio of said torque limited retrograde transmission device in one driving direction is: (a) same as a speed ratio in the other driving direction; (b) different than a speed ratio in the other driving direction; or (c) variable.

4. A bicycle propulsion system as claimed in claim 1, further comprising a pre-transmission device installed between the human input device and the torque limited retrograde transmission device for transmitting kinetic energy from the bidirectional input from the human input device to the torque limited retrograde transmission device.

5. A bicycle propulsion system as claimed in claim 1, further comprising a rear transmission connected between the torque limited retrograde transmission device and the driving wheel set for transmitting kinetic energy from the torque limited retrograde transmission device to the driving wheel set.

6. A bicycle propulsion system as claimed in claim 1, further comprising a pre-transmission device installed between the human input device and the torque limited retrograde transmission device and a rear transmission connected between the torque limited retrograde transmission device and the driving wheel set.

7. A bicycle propulsion system as claimed in claim 1, wherein said torque limiting component of said torque limited retrograde transmission device is installed at one or more of the following positions: (a) between a machine body and a rotatable shell of a gear train with bidirectional input and one-way output; (b) between a fixed shell and rotating parts of a gear train with bidirectional input and one-way output; and (c) between transmissions of a power transmission chain from an input terminal to an output terminal of the retrograde torque limited transmission device.

8. A bicycle propulsion system as claimed in claim 1, wherein said torque limited retrograde transmission device includes a first transmission gear train for transmitting a first rotary direction input to said one-way output and a second transmission gear train for transmitting a second rotary direction input to said one-way output, and respective first and second one-way transmission mechanisms installed between the first and second transmission gear trains for preventing interference between the first and second transmission gear trains.

9. A bicycle propulsion system as claimed in claim 1, wherein the torque limited retrograde transmission device includes a shell having a planetary gear train with an input shaft and an output shaft coaxial with the input shaft, a first end of the input shaft extending from a first side of the shell via a bearing and a second end of the input shaft extending through the output shaft via at least one of the first one-way transmission and the second one-way transmission, and a bearing installed between the output shaft and the shell,
    wherein the input shaft is connected to a sun gear through said torque limiting component, a planetary wheel engages the sun wheel and is installed between the sun wheel and an outer wheel, a center of the planetary wheel rotates at the planetary wheel shaft and a first end of the planetary wheel shaft is fixed at the shell of the drive device, the shell is fixedly installed at a machine body, and the first one-way transmission is installed between a ring structure of the outer wheel and the output shaft,
    wherein when the input shaft is driven in the first driving rotary direction, the second one-way transmission produces the constant rotary direction output through the output shaft via the first transmission gear train, when the input shaft is driven in the second driving rotary direction, the first one-way transmission produces the constant rotary direction output through the output shaft via the second transmission gear train, and when the output shaft is subject to said reverse torque that exceeds said overload torque, said torque limiting component transfers to a sliding or disengaged status to prevent locking of said torque limited transmission device.

10. The bicycle propulsion system as claimed in claim 1, wherein the torque limited retrograde transmission device includes a shell having a planetary gear train with an input shaft and an output shaft coaxial with the input shaft, a first end of the input shaft extending from a first side of the shell between a rotational structure of a planetary wheel support arm annular shelf and a third one-way transmission and a second end of the input shaft extending through the output shaft via at least one of the first one-way transmission and the second one-way transmission, and a bearing installed between the output shaft and the shell, wherein the input shaft is connected to a sun gear through said torque limiting component, a planetary wheel engages the sun wheel and is installed between the sun wheel and an outer wheel, a center of the planetary wheel rotates at the planetary wheel shaft and a first end of the planetary wheel shaft is integrated with the planetary wheel support arm annular shelf and the planetary wheel support arm annular shelf rotates between the input shaft and the third one-way transmission, the shell is fixedly installed at a machine body, and the first one-way transmission is installed between a ring structure of the outer wheel and the output shaft, wherein when the input shaft is driven in the first driving rotary direction, the second one-way transmission produces the constant rotary direction output through the output shaft via the first transmission gear train, when the input shaft is driven in the second driving rotary direction, the first one-way transmission produces the constant rotary direction output through the output shaft via the second transmission gear train, and when the output shaft is subject to said reverse torque that exceeds said overload torque, said torque limiting component transfers to a sliding or disengaged status to prevent locking of said torque limited transmission device.

11. The bicycle propulsion system as claimed in claim 1, wherein the torque limited retrograde transmission device includes a shell having an epicyclic gear train with an input shaft and an output shaft coaxial with the input shaft, a first end of the input shaft extending from a first side of the shell via a bearing and a second end of the input shaft extending through the output shaft via at least one of the first one-way transmission and the second one-way transmission, and a bearing installed between the output shaft and the shell, wherein the input shaft is connected with an inner bevel wheel through said torque limiting component, an epicyclic gear is installed between an outer bevel wheel and the inner bevel wheel, a center of the epicyclic gear rotates at an epicyclic gear shaft, a first end of the epicyclic gear shaft is integrated with the epicyclic gear support arm annular shelf, the epicyclic gear support arm annular shelf is fixed at the shell, the shell is fixedly installed at a machine body, and the first one-way transmission is installed between the outer bevel wheel and the output shaft, wherein when the input shaft is driven in the first driving rotary direction, the second one-way transmission produces the constant rotary direction output through the output shaft via the first transmission gear train, when the input shaft is driven in the second driving rotary direction, the inner bevel wheel drives the epicyclic gear and the outer bevel wheel which further drives the first one-way transmission for producing the constant rotary direction output through the output shaft via the second transmission gear train, and when the output shaft is subject to said reverse torque that exceeds said overload torque, said torque limiting component transfers to a sliding or disengaged status to prevent locking of said torque limited transmission device.

12. The bicycle propulsion system as claimed in claim 1, wherein the torque limited retrograde transmission device includes a shell having an epicyclic gear train with an input shaft and an output shaft coaxial with the input shaft, a first end of the input shaft being installed at an epicyclic gear support arm annular shelf via a bearing, the epicyclic gear support arm annular shelf being integrated with a first side of the shell via a third one-way transmission, a second end of the input shaft extending through the output shaft via at least one of the first one-way transmission and the second one-way transmission, and a bearing installed between the output shaft and the shell, wherein the input shaft is connected with an inner bevel wheel through said torque limiting component, an epicyclic gear is installed between an outer bevel wheel and the inner bevel wheel, a center of the epicyclic gear rotates at an epicyclic gear shaft, a first end of the epicyclic gear shaft is integrated with the epicyclic gear support arm annular shelf, the epicyclic gear support arm annular shelf rotating between the input shaft and the third one-way transmission, the shell is fixedly installed at a machine body, and the outer bevel wheel is connected to the output shaft via the first one-way transmission, wherein when the input shaft is driven in the first driving rotary direction, the second one-way transmission produces the constant rotary direction output through the output shaft via the first transmission gear train, when the input shaft is driven in the second driving rotary direction, the inner bevel wheel drives the epicyclic gear and the outer bevel wheel which further drives the first one-way transmission for producing the constant rotary direction output through the output shaft via the second transmission gear train, and when the output shaft is subject to said reverse torque that exceeds said overload torque, said torque limiting component transfers to a sliding or disengaged status to prevent locking of said torque limited transmission device.

13. The bicycle propulsion system as claimed in claim 1, wherein the torque limited retrograde transmission device includes a shell having an input shaft and an output shaft coaxial with the input shaft, a first end of the input shaft extending from a first side of the shell via a bearing and a second end of the input shaft extending through the output shaft via at least one of the first one-way transmission and the second one-way transmission, and a bearing installed between the output shaft and the shell, wherein the input shaft extends through a fourth one-way transmission and is integrated with a first driving wheel, the first driving wheel rotates in a different direction than a second driving wheel, a third driving wheel is connected with the output shaft through the torque limiting component, the second driving wheel and a fourth driving wheel are co-integrated with a first revolving shaft, a bearing is installed between the first revolving shaft and the shell, and the third driving wheel and the fourth driving wheel engage a transmission belt to form a first driving wheel set, wherein when the input shaft is driven in the first driving rotary direction, the second one-way transmission produces the constant rotary direction output through the output shaft via the first transmission gear train, when the input shaft is driven in the second driving rotary direction, the fourth one-way transmission drives the first driving wheel which drives the second driving wheel which drives the fourth driving wheel which drives the third driving wheel for producing the constant rotary direction output through the output shaft via the second transmission gear train, and when the output shaft is subject to said reverse torque that exceeds said overload torque, said torque limiting component transfers to a sliding or disengaged status to prevent locking of said torque limited transmission device.

14. The bicycle propulsion system as claimed in claim 1, wherein the torque limited retrograde transmission device includes a shell having an input shaft and an output shaft coaxial with the input shaft, a first end of the input shaft extending from a first side of the shell via a bearing and a second end of the input shaft extending through the output shaft via at least one of the first one-way transmission and the second one-way transmission, and a bearing installed between the output shaft and the shell, wherein the input shaft extends through a fourth one-way transmission and is integrated with a first driving wheel, the first driving wheel rotates in a different direction than a second driving wheel, a fifth driving wheel is connected with the output shaft through the torque limiting component, the second driving wheel and a sixth driving wheel are co-integrated with a first revolving shaft, a bearing is installed between the first revolving shaft and the shell, and the sixth driving wheel engages a seventh driving wheel which rotates a second revolving shaft which drives the fifth driving wheel to form a first driving wheel set, and the second revolving shaft being integrated with the shell, wherein when the input shaft is driven in the first driving rotary direction, the second one-way transmission produces the constant rotary direction output through the output shaft via the first transmission gear train, when the input shaft is driven in the second driving rotary direction, the fourth one-way transmission drives the first driving wheel which drives the second driving wheel which drives the sixth driving wheel which drives the fifth driving wheel via the seventh driving wheel for producing the constant rotary direction output through the output shaft via the second transmission gear train, and when the output shaft is subject to said reverse torque that exceeds said overload torque, said torque limiting component transfers to a sliding or disengaged status to prevent locking of said torque limited transmission device.

15. The bicycle propulsion system as claimed in claim 1, wherein the torque limited retrograde transmission device includes a shell having an input shaft and an output shaft, a first end of the input shaft extending from a first side of the shell via a first bearing and a second end of the input shaft extending through a third driving wheel via a first one-way transmission, the input shaft and the output shaft having different axes, and a bearing installed between the second end of the input shaft and the shell, and the input shaft receiving a rotary power source at at least one of the first end of the input shaft and the second end of the input shaft, wherein the input shaft extends through a fourth one-way transmission and is integrated with a first driving wheel, the first driving wheel rotates in a different direction than a second driving wheel, the second driving wheel in integrated with the output shaft and a fourth driving wheel is connected with the output shaft through the torque limiting component, a second bearing is installed between the output shaft and the shell, and a third driving wheel and the fourth driving wheel engage a transmission belt to form a first driving wheel set, wherein when the input shaft is driven in the first driving rotary direction, the first one-way transmission produces the constant rotary direction output through the output shaft by driving the third driving wheel which drives a transmission belt which drives the fourth driving wheel via the first transmission gear train, when the input shaft is driven in the second driving rotary direction, the fourth one-way transmission produces the constant rotary direction output through the output shaft by driving the first driving wheel which drives the second driving wheel via the second transmission gear train, and when the output shaft is subject to said reverse torque that exceeds said overload torque, said torque limiting component transfers to a sliding or disengaged status to prevent locking of said torque limited transmission device.

16. The bicycle propulsion system as claimed in claim 1, wherein the torque limited retrograde transmission device includes a shell having an input shaft and an output shaft, a first end of the input shaft extending from a first side of the shell via a first bearing and a second end of the input shaft extending through a fifth driving wheel via a first one-way transmission, the input shaft and the output shaft having different axes, and a bearing installed between the second end of the input shaft and the shell, and the input shaft receiving a rotary power source at least one of the first end of the input shaft and the second end of the input shaft, wherein the input shaft extends through a fourth one-way transmission and is integrated with a first driving wheel, the first driving wheel rotates in a different direction than a second driving wheel, the second driving wheel is integrated with the output shaft and a sixth driving wheel is connected with the output shaft through the torque limiting component, a second bearing is installed between the output shaft and the shell, the fifth driving wheel drives the sixth driving wheel via a seventh driving wheel, and a seventh driving wheel rotates a second revolving shaft which is installed on the shell, wherein when the input shaft is driven in the first driving rotary direction, the first one-way transmission produces the constant rotary direction output through the output shaft by driving the fifth driving wheel which drives the seventh driving wheel which drives the sixth driving wheel via the first transmission gear train, when the input shaft is driven in the second driving rotary direction, the fourth one-way transmission produces the constant rotary direction output through the output shaft by driving the first driving wheel which drives the second driving wheel via the second transmission gear train, and when the output shaft is subject to said reverse torque that exceeds said overload torque, said torque limiting component transfers to a sliding or disengaged status to prevent locking of said torque limited transmission device.

* * * * *